Oct. 23, 1923.
M. KAMMERHOFF
BATTERY HOLDER
Filed April 26, 1920    2 Sheets-Sheet 1
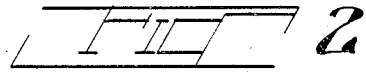
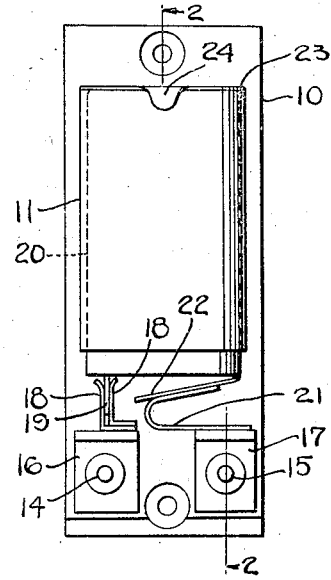
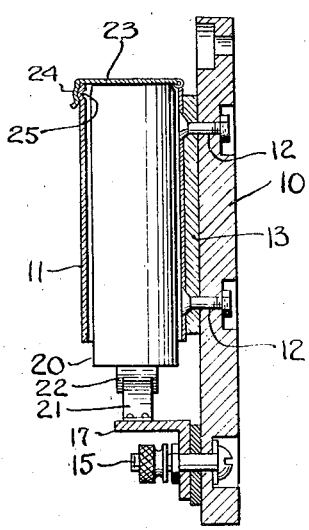
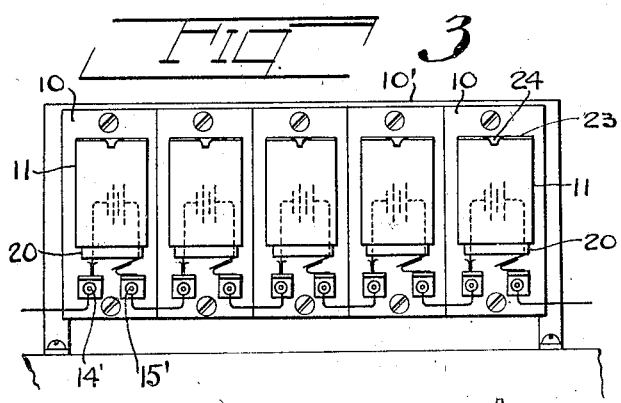
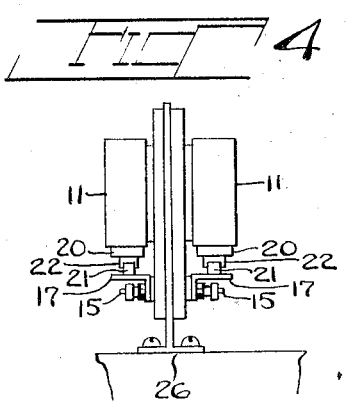
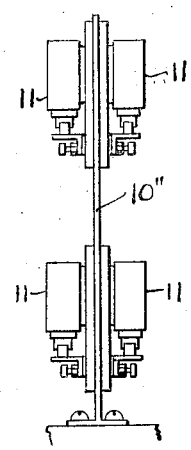
INVENTOR
Meno Hammerhoff
BY
H. H. Dyke
ATTORNEY Oct. 23, 1923.                                                     1,471,739
                        M. KAMMERHOFF
                         BATTERY HOLDER
                      Filed April 26, 1920        2 Sheets-Sheet 2
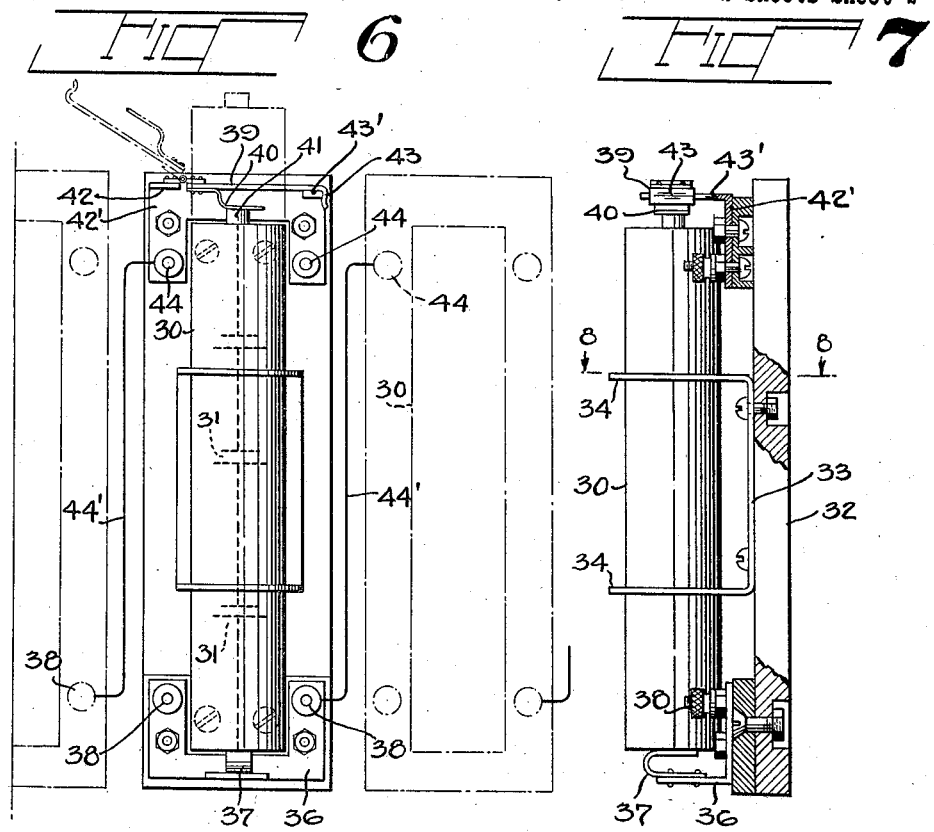
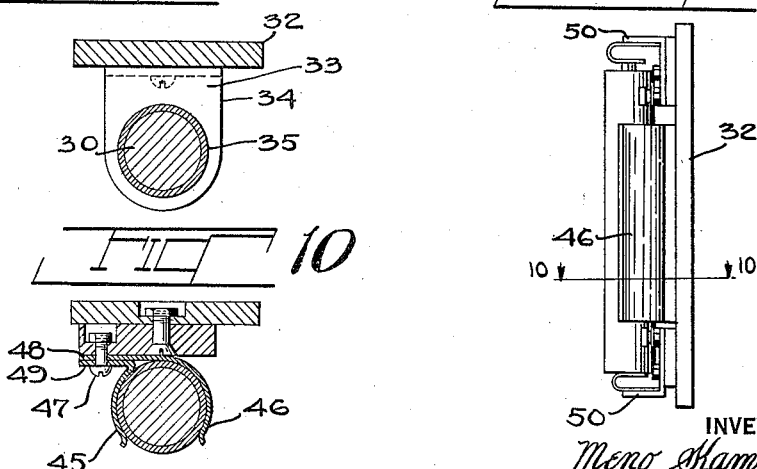
INVENTOR
Meno Kammerhoff
BY H. H. Dyke
ATTORNEY Patented Oct. 23, 1923.

1,471,739

UNITED STATES PATENT OFFICE.

MENO KAMMERHOFF, OF ORANGE, NEW JERSEY.

BATTERY HOLDER.

Application filed April 26, 1920. Serial No. 376,498.

*To all whom it may concern:*

Be it known that I, MENO KAMMERHOFF, a citizen of the Republic of Germany, and a resident of Orange, county of Essex, and State of New Jersey, have invented certain new and useful Improvements in Battery Holders, of which the following is a specification.

My invention relates to a battery holder and particularly a holder for small dry batteries of the flash-light type, which are not provided with binding screws.

With a holder in accordance with my invention, these flash-light batteries may be readily put into place and as readily removed or replaced, and connections are provided whereby part or all may be used at one time, or the batteries may be connected up as desired, as, for example, in series or in parallel or both.

In the drawings I have shown certain forms of holder for affording an understanding of my invention and not for its limitation.

In the said drawings, Fig. 1 is a front view of a holder for a single flash-light battery. Fig. 2 is a vertical sectional view of said holder on the broken line 2—2, Fig. 1.

Fig. 3 is a front view of a series of holders similar to that shown in Fig. 1, arranged on an upright plate. Fig. 4 is an end view of same. Fig. 5 is an end view of a holder similar to Fig. 4, but showing two banks of batteries. Fig. 6 is a part diagrammatical front view of a modified form of holder adapted for holding the elongated type of flash-light battery in which separate cells are arranged end to end. Fig. 7 is a side view of same partly in section.

Fig. 8 is a horizontal section taken on line 8—8, Fig. 7.

Fig. 9 is a side view of a further modified form of holder for flash-light batteries of the elongated type, and Fig. 10 is a sectional view taken on line 10—10, Fig. 9.

In the holder of Figs. 1 and 2, the back 10 has the shell 11 secured thereto, as by screws 12. A spacing piece 13 is preferably interposed. Binding screws 14 and 15 are permanently connected to back 10 and are adapted to make electrical connection with the poles of the flash-light battery. In the form shown in which the back is of insulating material, the binding screws serve to support angle pieces 16 and 17, and angle piece 16 carries a pair of tongues 18, 18 between which the tongue-like pole member 19 of the battery 20 is received. Angle piece 17 is provided with a leaf spring member 21 of substantially U-shape adapted to bear against and make electrical connection with the battery pole 22, which is laterally deflected as is customary in flash-light batteries of this type.

The shell 11 preferably has a hinged cover 23, with a snap lug 24, adapted to be sprung over a head 25 in the shell as shown in Fig. 2 and to hold the battery down against spring contact member 21.

To insert the battery the cover 23 is opened and the battery introduced from above and the cover closed. The electrical connections are made in any desired way from the binding screws 14, 15.

In the form shown in Fig. 3, a plurality of shells 11 are secured to an upright plate 10' provided with binding screws 14', 15', which, in the form shown, are connected up in series. The plate 10' may be placed against a wall or other support or may be supported on a base 26 and provided with holders on the opposite sides as shown in Fig. 4. A plurality of sets of rows of holders 11 may be placed one above another on a plate 10'' as shown in Fig. 5.

For the long batteries containing several cells arranged therein end to end, holders may be constructed as shown in Figs. 6–10. These batteries 30 are usually cylindrical in form and contain several cells 31. The holder shown in Figs. 6, 7 and 8 comprises a back 32, to which a plate 33 is secured having portions 34, 34 bent at right angles thereto and provided with aligned openings 35 to receive the battery 30.

Where the poles of the battery are at the ends thereof one of the connections is provided at each end of the holder. The bottom connection may comprise a plate 36 provided with a U-shaped spring 37 adapted to make contact with the lower pole of the battery. Binding screws 38, 38 are provided, preferably one at each side of member 36, to facilitate the ready making of any circuit connection desired.

The upper connecting means preferably also takes the form of a hinged lid. The hinged member 39 is provided with a leaf spring connecting member 40 adapted to make contact with the battery pole 41. It is hinged on a lug 42 of a plate 42' and has a spring catch 43 adapted to take over a lug 43' formed on plate 42'. The plate 42' is secured to the back 32 and is preferably provided with a pair of binding screws 44, 44 arranged one at each side of the battery to facilitate the ready making of any desired connection. In the construction shown wires 44' are carried from one of the bottom binding screws 38 to an upper binding screw 44 of the next battery connector plate, but various other arrangements may be resorted to according to the voltage and amperage required.

The holder of Figs. 9 and 10 differs from that of Figs. 6, 7 and 8 in that for the apertured plate 33 a spring clamp is substituted comprising a pair of spring members 45 and 46. In order to simplify construction, the same fastening members, as screws 47, are used to secure same to back 32', and the clamp member 46 is provided with an extension 48, which is received behind flange 49 of clamp member 45 and the screws 47 passed through both.

With such arrangement the top and bottom connection members 50, 50 may be constructed in the same way as the bottom connection members 36, 37 of the holder shown in Figs. 6 and 7.

It will be seen that with holders in accordance with my invention any desired number of batteries, as flash-light batteries, not provided with binding screws, may be made use of for furnishing desired combinations of electrical current, such as for wireless sets and the like and when a battery or batteries are exhausted, same may be removed readily and replaced by new batteries, or batteries may be moved from one relation to another, according to requirements and with the utmost ease, and all cells, or a given part thereof, or even a single unit, may be connected up with any desired apparatus.

Modifications and changes may be resorted to within the scope of my claim without departing from the spirit of my invention or sacrificing the advantages thereof.

I claim:

In a battery holder for dry batteries without binding screws, an upright plate of insulating material, members of conducting material arranged in pairs on said plate, means for electrically connecting said members in substantially permanent electrical relation, a plurality of shells mounted on said plate and arranged one over each of the pairs of said members, a hinged snap cover for each of said shells and adapted when closed with dry batteries in place to bear against the ends of the batteries opposite said members and to hold the batteries with their poles in positive contact therewith, the said members serving to support the batteries.

In witness whereof I have signed my name hereto.

MENO KAMMERHOFF.